(12) United States Patent
Ramkumar et al.

(10) Patent No.: US 8,762,552 B2
(45) Date of Patent: Jun. 24, 2014

(54) FINE GRANULARITY ACCESS CONTROL FOR A STORAGE AREA NETWORK

(75) Inventors: Gurumurthy D Ramkumar, San Fransisco, CA (US); Hans Logan Henriquez, San Francisco, CA (US); David Brooks Hamilton, Milpitas, CA (US); Xinyu Zhang, Union City, CA (US); Parry Kejriwal, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1817 days.

(21) Appl. No.: 11/105,937

(22) Filed: Apr. 13, 2005

(65) Prior Publication Data

US 2006/0235985 A1 Oct. 19, 2006

(51) Int. Cl.
*G06F 15/16* (2006.01)
*G06F 15/173* (2006.01)
*G06F 17/30* (2006.01)
*G06F 21/45* (2013.01)
*H04L 29/06* (2006.01)
*H04L 29/08* (2006.01)
*G06F 3/06* (2006.01)

(52) U.S. Cl.
CPC .......... *G06F 17/30035* (2013.01); *G06F 3/067* (2013.01); *G06F 21/45* (2013.01); *H04L 63/102* (2013.01); *H04L 67/12* (2013.01); *H04L 63/105* (2013.01); *H04L 29/08549* (2013.01)
USPC ............................ 709/229; 709/223; 709/225

(58) Field of Classification Search
CPC ... G06F 3/067; G06F 17/30035; G06F 21/45; H04L 29/08549; H04L 41/00; H04L 63/102; H04L 63/105; H04L 67/12
USPC ........... 709/223, 224, 229, 225; 711/100, 163
See application file for complete search history.

(56) References Cited

U.S. PATENT DOCUMENTS

| | | | | |
|---|---|---|---|---|
| 6,314,428 | B1 * | 11/2001 | Brew et al. | 1/1 |
| 6,513,039 | B1 * | 1/2003 | Kraenzel | 707/784 |
| 6,538,669 | B1 * | 3/2003 | Lagueux et al. | 715/764 |
| 6,647,387 | B1 * | 11/2003 | McKean et al. | 707/9 |
| 7,010,600 | B1 * | 3/2006 | Prasad et al. | 709/225 |
| 7,272,848 | B1 * | 9/2007 | Meyer et al. | 726/1 |
| 7,457,824 | B1 * | 11/2008 | Strom et al. | 1/1 |
| 7,676,551 | B1 * | 3/2010 | Dalia et al. | 709/218 |
| 2002/0095602 | A1 * | 7/2002 | Pherson et al. | 713/201 |
| 2002/0184398 | A1 * | 12/2002 | Orenshteyn | 709/310 |
| 2003/0233439 | A1 * | 12/2003 | Stone et al. | 709/223 |
| 2004/0064543 | A1 * | 4/2004 | Ashutosh et al. | 709/224 |
| 2011/0119203 | A1 * | 5/2011 | Juarez et al. | 705/36 R |

* cited by examiner

*Primary Examiner* — Brian J Gillis
(74) *Attorney, Agent, or Firm* — Wong, Cabello, Lutsch, Rutherford & Brucculeri, L.L.P.

(57) ABSTRACT

A SAN management software program controls access to resources in the SAN by associating individual users with one or more administration domains. A user that is associated with an administration domain that includes a port of a SAN switch can configure or otherwise access the port but is restricted from accessing ports outside of that administration domain. Likewise, access to other sub-fabric resources can be restricted and allowed to individual users and users in specific roles or groups. In this manner, the SAN administrative user has very specific control over which users can access which SAN resources and what level of access these users are granted.

20 Claims, 10 Drawing Sheets

FINE GRANULARITY ACCESS CONTROL FOR A STORAGE AREA NETWORK

TECHNICAL FIELD

The invention relates generally to administration of a storage area network, and more particularly to providing fine granularity access control for a storage area network.

BACKGROUND

A storage area network (SAN) may be implemented as a high-speed, special purpose network that interconnects different kinds of data storage devices with associated data servers on behalf of a large network of users. Typically, a storage area network is part of the overall network of computing resources for an enterprise. The storage area network is usually clustered in close geographical proximity to other computing resources, such as mainframe computers, but may also extend to remote locations for backup and archival storage using wide area network carrier technologies.

In many SAN environments, a SAN administrative user manages user access to SAN resources, such as applications and storage, using a SAN management software program. These users are typically administrative personnel themselves, who need to configure, monitor, and manage some portion of the SAN as part of their jobs. For example, the SAN administrative user may wish to allow a network technician access to switches in the network to alter their configurations, add new switches, etc. However, existing SAN management software generally gives the SAN administrative user limited options for controlling user access—either the user gets access to all of the SAN resources in a fabric or the user does not get any access to the SAN resources in the fabric.

Unfortunately, such course access control does not meet the more sophisticated requirements of modern SAN management. For example, for security and safety reasons, a SAN administrative user may wish to allow one user to alter the configuration of an individual port on a given switch but not wish to give that user the ability to alter other ports on that same switch. Existing approaches do not allow this level of user access control.

SUMMARY

Implementations described and claimed herein address the foregoing problems by providing a SAN administrative user with finer granularity of user access control, such that a given user or group of users may be granted access to individual sub-fabric resources (e.g., individual switches, a selected set of individual ports on one or more switches in the SAN or to individual logical unit numbers (LUNs) of storage devices coupled to the SAN). In this manner, for example, one user may be granted access to an individual port or group of ports on a switch that service (e.g., provide storage resources for) an application but the same user may be prohibited from accessing other ports on that same switch.

Such fine control over access to SAN resources has many advantages. The SAN administrative user can limit a user's access to a subset of ports and LUNs, thereby preventing the user from intentionally or inadvertently affecting other ports and LUNs serving mission critical applications. For example, one user may manage an email application, and therefore email application's SAN resources, and a second user may manage an accounting application, and therefore the accounting application's SAN resources. Accordingly, the SAN administrative user may selectively allocate the set of switches and individual ports corresponding to the email application to the first user and selectively allocate a different set of switches and individual ports corresponding to the accounting application to the second user. In this manner, changes made by the first user can be isolated from the SAN resources of the accounting application, thereby minimizing the risk of interruption in the accounting application's storage access.

This fine granularity access control can be allocated using "administration domains". Each user can be associated with one or more administration domains, which define the host bus adapters (HBAs), fabrics (sets of switches), switches, ports and LUNs in the SAN that the users in the administration domain may access. Collectively, individual HBA ports, switches, switch ports, and LUNs are considered "sub-fabric resources". In addition, administration domains may also define what level of access the users are granted. That is, the access granted to an administration domain can be of various levels, including without limitation "no view", "read only", and "read and write". It should also be understood that an individual SAN resource may be associated with multiple administration domains, depending on user requirements.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave or other communication media by a computing system and encoding the computer program.

Other implementations are also described and recited herein.

BRIEF DESCRIPTIONS OF THE DRAWINGS

DETAILED DESCRIPTIONS

A SAN administrator can control access to resources in the SAN by associating individual users with one or more administration domains. A user that is associated with an administration domain that includes a port of a SAN switch can configure or otherwise access the port but is restricted from accessing ports outside of that administration domain. For example, a user only associated with Admin Domain A can be granted port-level read-write access to one set of ports in a given switch while a user only associated with Admin Domain B can be granted read-only port-level access to a different set of ports in the switch. Accordingly, the Admin Domain A user cannot read or write to configuration of the ports in Admin Domain B, while the Admin Domain B user cannot read or write to configuration of ports associated with Admin Domain A or write to configuration of ports in Admin Domain B. In this manner, the SAN administrative user has very specific control over which users can access which SAN resources and what level of access these users are granted.

Figure 1:
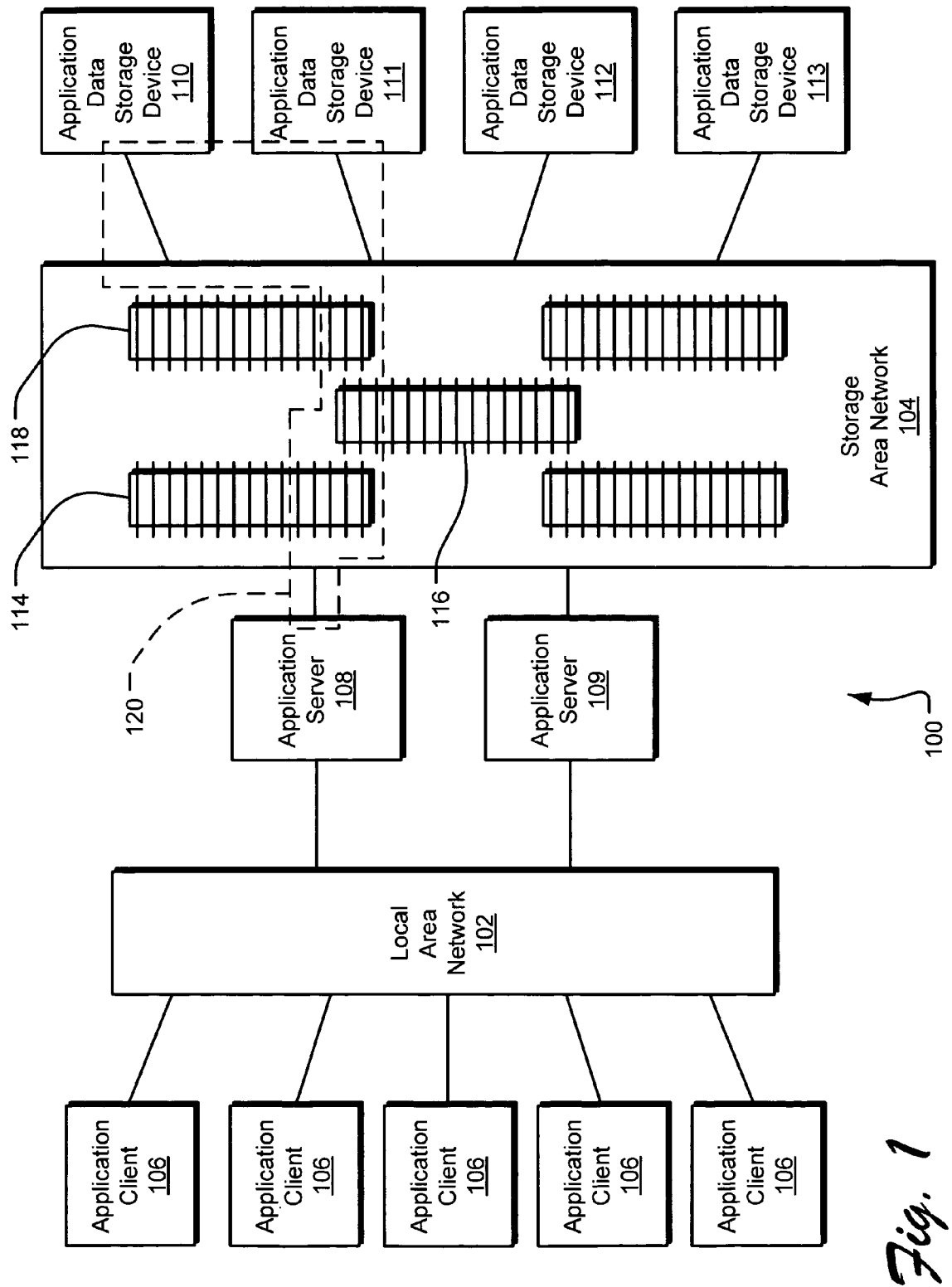
FIG. 1 illustrates an exemplary computing and storage framework.

FIG. 1 illustrates an exemplary computing and storage framework 100 including a local area network (LAN) 102 and a storage area network (SAN) 104. Various application clients 106 are networked to application servers 108 and 109 via the LAN 102. Users can access applications resident on the application servers 108 and 109 through the application clients 106. The applications may depend on data (e.g., an email database) stored at one or more of the application data storage devices 110. Accordingly, the SAN 104 provides connectivity between the application servers 108 and 109 and the application data storage devices 110 to allow the applications to access the data they need to operate. It should be understood that a wide area network (WAN) may also be included on either side of the application servers 108 and 109 (i.e., either combined with the LAN 102 or combined with the SAN 104).

A user at an application client 106 can run a SAN management software tool that can configure resources in the SAN 104. For example, an email administrative user may wish to alter the storage connectivity of an email application, which may execute on the application server 108 and store its associated email documents and parameters through an HBA of application server 108, switches 114, 116, and 118, and individual ports on the switches to the storage devices 110, 111, 112 and 113 (which can be identified by LUNs), collectively identified as resources 120. Accordingly, from the perspective of the SAN (and the application administrative users), an application is characterized by the HBAs, fabrics, switches, ports, and LUNs that are designated to provide the application with storage access. Through the SAN management software tool, for example, the email administrative user can configure the fabrics, switches, individual ports, and LUNs that service the email application. Exemplary configuration tasks may include without limitation setting up zoning, port fencing, port blocking, port binding, and security; altering the SAN resources accessible to an application (e.g., adding new switches, performing switch maintenance); and monitoring SAN resources.

By the same token, the email administrative user does not need configuration access to fabrics, switches, ports, and LUNs not associated with the email application. Therefore, the SAN administrative user may construct an administration domain that can limit the email administrative user's access to only the SAN resources associated with the email application (e.g., SAN resources 120). Alternatively, users can log in under different user accounts having different roles (e.g., routine administration user versus universal redesign user) in order to tailor the potential impact of their actions in those specific roles. This access control can therefore prevent one user from inadvertently (or even maliciously) interrupting storage connectivity for other mission-critical applications, thereby increasing the robustness of the entire enterprise computing system.

Figure 2:
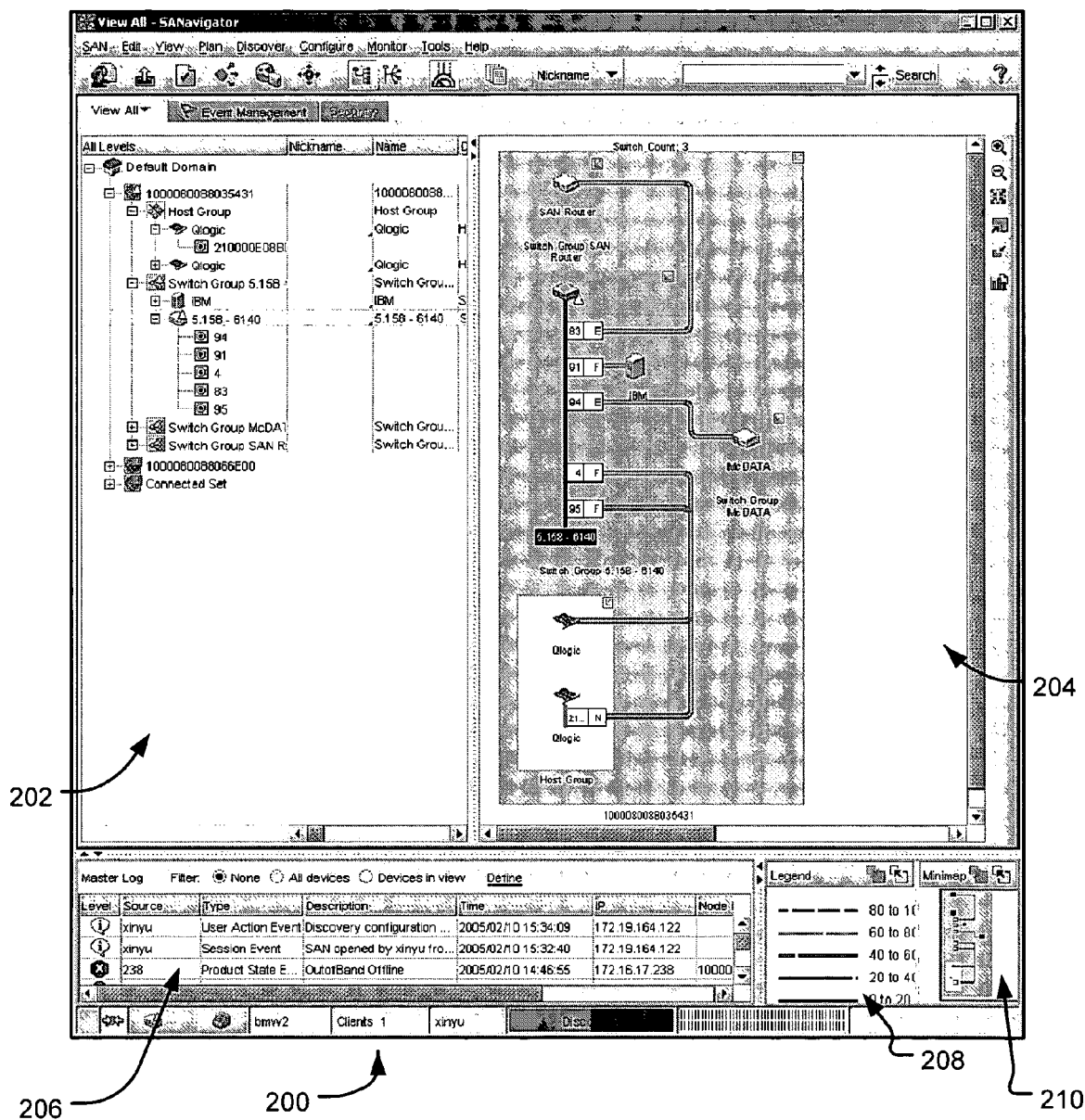
FIG. 2 illustrates an initial screenshot of an exemplary SAN management tool providing fine granularity access control.

FIG. 2 illustrates an initial screenshot 200 of an exemplary SAN management tool providing fine granularity access control. The screenshot 200 is divided up into three main sections: resource tree 202, topology map 204, and event log 206.

Under the heading of "Default Domain", the resource tree 202 shows a hierarchy of the all of the resources discovered in the SAN. In the illustrated implementation, the discovered resources include HBAs, fabrics, resource groups, switches, and individual ports. In an alternative implementation, LUNs may also be discovered and displayed as discovered SAN resources.

Discovery refers to the automatic detection, identification and registration of resources that exist within the SAN. Discovery can be triggered manually, at periodic intervals, at start-up, or in response to a detected change in the SAN configuration (e.g., an addition a new switch). In some implementations, software agents query devices in the SAN, receive information about SAN resources from these devices, and report the discovery results to the SAN management software tool. Discovery results may include identification of various devices and other resources (e.g., including individually identified HBAs, individually identified switches, individually identified ports of the devices, individually identified LUNs, etc.) within the SAN as well as connectivity and configuration information of such resources. Identification can be accomplished using identification numbers or codes or other designations that uniquely identify each resource in the network topology. Exemplary resource identifiers include may include Internet Protocol (IP) addresses, globally unique hierarchical identifiers, and World Wide Names.

Specifically, the resource tree 202 shows three SAN fabrics, 1000080088035431, 1000080088066E00, and Connected Set. Within the fabric 1000080088035431, the resource tree 202 shows four resource groups, Host Group, Switch Group 5.158-6140, Switch Group McDATA, and Switch Group SAN Router. Within the Host Group, the resource tree 202 shows two Qlogic host bus adapters (HBAs), and one of the Qlogic HBAs shows a port 210000E08B0. The resource tree portion for the other Qlogic HBA is not expanded in the display, so the specific port information for that HBA is not shown. Within the Switch Group 5.158-6140, the resource tree 202 shows two switches, IBM and 5.158-6140. The IBM switch is not expanded in the display, so the specific port information for the IBM switch is not shown. The resource tree 202 shows 5 ports for the 5.158-6140 switch, each port having a numerical identifier: 94, 91, 4, 83, and 95.

The fabrics 1000080088066E00 and Connected Set are not expanded in the display, so no specific lower level resource information is shown in the resource tree 202 for these two fabrics. The resource groups for Switch Group McDATA and Switch Group SAN Router are not expanded in the display, so no specific lower level resource information is shown in the resource tree 202 for these two resource groups.

The topology map 204 reflects the topology of the resources shown in the default domain of the resource tree 202. The topology map 204 graphically illustrates the interconnectivity of the devices in the default domain. As shown in FIG. 2, SAN resources discovered in the fabric 1000080088035431 are displayed in the topology map 204, including the SAN Router of the Switch Group SAN Router, the McDATA switch of the Switch Group McDATA, the IBM switch and the 5.158-5140 switch of the Switch Group 5.158-5140, and the two Qlogic HBAs of the Host Group. Also note that the individual ports of the 5.158-5140 switch and one of the Qlogic HBAs are also shown. In particular, port 21 of one of the Qlogic HBAs is expanded and shown in the topology map 204 as being connected to one of the ports of the 5.158-5140 switch. (The number "21" refers to a port identification number.)

Port 21 of the Qlogic switch is also designated as an N_Port (i.e., a node port), whereas the corresponding port 4 on the 5.158-5140 switch is designated as an F_Port (i.e., a fabric port). In contrast, port 94 on the 5.158-5140 switch is designated as an E_Port (i.e., an expansion port), because it connects to a port in another switch (i.e., the McDATA switch). Display of individual ports in the topology map 204 is helpful to a SAN management tool user to understand the interconnectivity and to facilitate access to the configuration of each port.

The topology map 204 may also be filtered to show only a predefined view (e.g., resources failing to meet a predefined criterion may be omitted from the topology map view). Accordingly, the use of different views allows the user to simplify the display of the topology map 204, particularly when the domain includes a complex set of resources and interconnections. For example, the fabrics 1000080088066E00 and Connected Set have been filter from the topology map 204 using a predefined restrictive view.

The event log 206 displays descriptions of events detected by the SAN management tool. The Master Log toolbar indicates that no filter (i.e., "None") is being applied to the event log 206, so all events detected from accessible resources are reported in the event log 206. (Note: "Accessible resources" refers to resources within administration domains associated with the user.) The "All Devices" selection causes events from all accessible resources to be reported to the event log 206, subject a defined filter. The filter can be defined by selecting the "Define" link. Events may also be filtered according to a view, which limits the resources for which events are monitored/reported. Exemplary events may include without limitation Product Hardware events, Product State events, User Action events, Security events, Network Events, Session events, Fabric events, etc. Some events are device-dependent, which may imply administration-domain-dependent, while other events are generic, which implies that the event is reported without consideration of which administration domains the user is a member of.

A legend 208 and a minimap 210 are also shown in the screenshot 200. The legend 208 illustrates the line format for devices having different numbers of ports (e.g., the solid line running vertically along the ports of the 5.158-5140 switch indicates the switch has between 0 and 20 ports). The minimap 210 allows the user to select a region of the overall SAN topology in order to navigate quickly to that region in the topology map 204, although in this illustration, the entire SAN topology available in the view is visible in the topology map 204.

Figure 3:
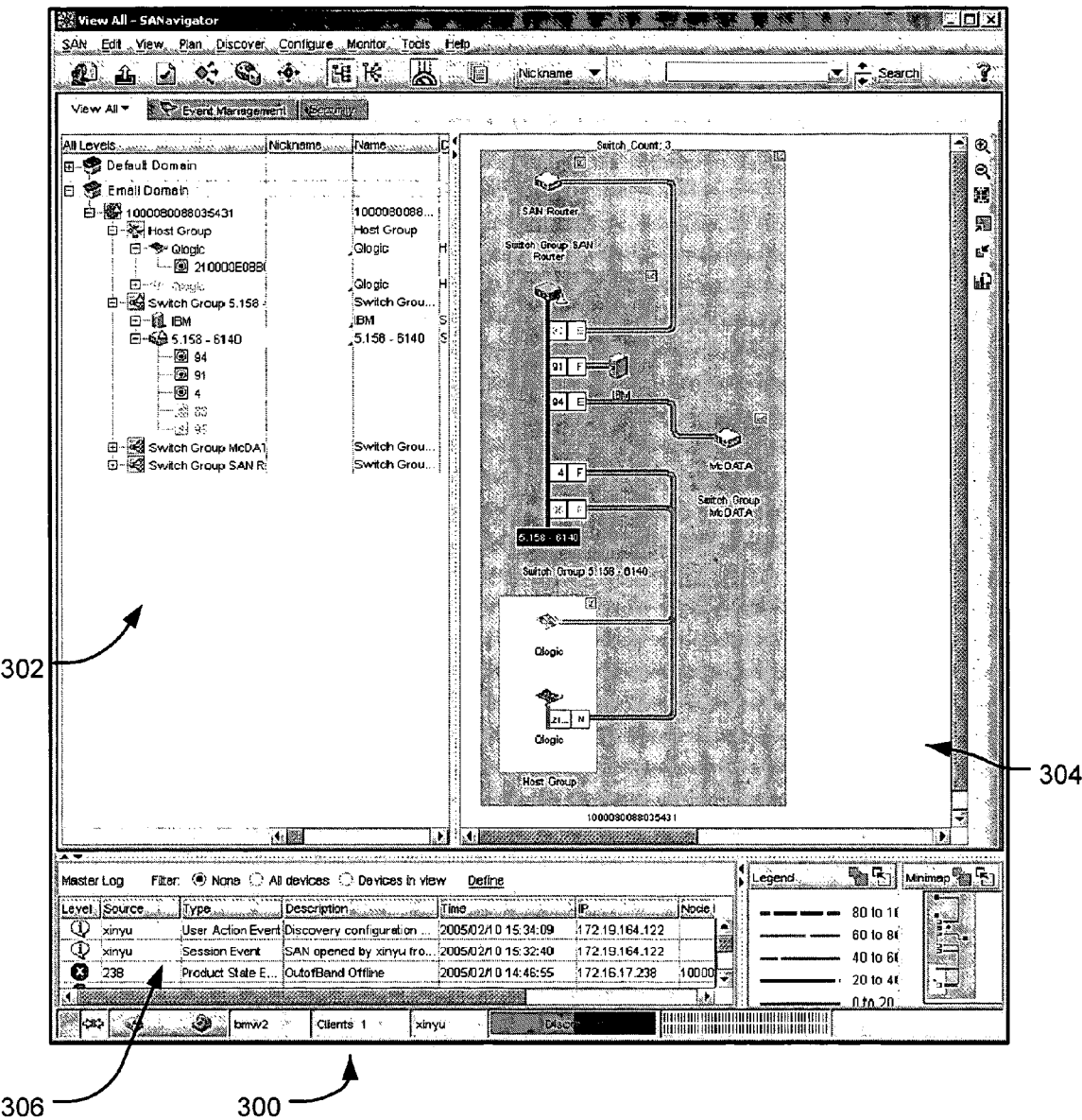
FIG. 3 illustrates a screenshot of an exemplary SAN management tool showing an administration domain.

FIG. 3 illustrates a screenshot 300 of an exemplary SAN management tool showing an administration domain. The screenshot 300 is also divided up into three main sections: resource tree 302, topology map 304, and event log 306. The heading of "Default Domain" is collapsed.

A heading for an administration domain called "Email Domain" has been created from the resources in the "Default Domain". In one implementation, a SAN administrative user, who has broad permissions for all resources in the SAN (e.g., for the entire default domain), can define subsets (i.e., proper subsets or not) of the Default Domain. Such proper subsets are termed "administration domains". In this manner, a SAN administrative user can associate users to individual administration domains, rather than the entire default domain, thereby limiting each user only to the SAN resources required by the user's role or group (e.g., user's may be grouped together if they fulfill common role, such as an email administrator). Role-based access control allows user's to obtain access rights appropriate for a given role. Resources outside the administration domains associated with a given user are not accessible for configuration by the user, although it should be understood that a single user may be associated with multiple administration domains. The resource tree 302 shows a hierarchy of an administration domain named "Email Domain". As shown, the email domain is limited to a proper subset of the discovered SAN resources, namely a proper subset of the fabric 1000080088035431. Therefore, a user associated with the email domain will not have configuration access to the fabrics 1000080088066E00 and Connected Set, and in at least one implementation, will not have viewable access to those fabrics.

The SAN administrative user may create an administration domain using the user interface of the SAN management software tool. In one implementation, the SAN administrative user may select a "Create Domain" command accessible through a context menu or the menu bar to create a new administration domain. An administration domain may be created without any SAN resources, using a "Start empty" subcommand, or from a copy of any existing domain (e.g., either the default domain or another administration domain), using a "Start from current domain" subcommand. In response to such commands, a new item at the same level as the "Default Domain" is created in the resource tree with a unique name (e.g., "New Domain1"). The user is given the option of renaming the new administration domain.

Each administration domain also includes various domain properties. Exemplary domain properties, some of which are editable by the SAN administrative user, may include those indicated in the table below, although other domain property combinations are also contemplated.

TABLE 1

Domain Properties

| Domain Property | Description |
| --- | --- |
| Domain Name | A unique name for the administration domain (editable) |
| Created By | Name of the user who created the administration domain |
| Created At | Time and date of creation of the administration domain |
| Last Modified By | Name of the user who last modified the administration domain |
| Last Modified At | Time and date of last modification to the administration domain |
| # of Shared Fabrics | The number of shared fabrics in the administration domain |
| # of Shared Devices | The number of shared devices in the administration domain |
| # of Shared Ports | The number of shared ports in the administration domain |
| # of LUNS | The number of shared LUNs in the administration domain |
| Contact | The name of personnel to contact regarding the administration domain (editable) |
| Location | Physical location of the hardware in the administration domain (editable) |
| Description | Description of the administration domain (editable) |

The domain properties not labeled as editable are generated automatically by the SAN management software tool.

When a resource is "shared", the resource is allocated to more than one administration domain. When configuration changes are made to shared resources, the user is alerted that the resource is shared and any changes may impact another administration domain. If the user proceeds with a change, users in the other administration domains that share the resources will receive an alert relating to the change. In addition, other domain properties may include information identifying how many other administration domains share a given resource and which administration domains those are.

After an administration domain is created, SAN resources may be added to or removed from the new administration domain. To add a resource in one implementation, the user may select resources from the default domain (or other administration domain) and drag the selected resource to the newly created administration domain. Alternatively, a context menu command or menu bar command may be used to add a resource to or remove a resource from an existing domain. To remove a resource, a context menu command or menu bar command may be selected to delete one or more selected resources from the administration domain or the user can merely select the resource in the administration domain and press the delete key.

It should be understood that resources at any level may be added to or removed from an administration domain. For example, an individual switch port may be added to an empty administration domain. The resource tree would display the fabric, resource group, and switch containing the added switch port, but a user would not have configuration access to other ports on the switch, or to the switch, resource group, or fabric containing the added switch port, unless these individual resources were specifically added to the administration domain. For example, the user could block the added switch port but could not block other switch ports on the same switch or otherwise configure the switch. (Nevertheless, in one implementation, the resource tree displays all of the switch ports on a switch, but the ports not in the administration domain are grayed out to indicate that these ports are not accessible.)

Given that different administration domains may "own" or include resources at different levels in the resource hierarchy, it should be understood that ownership at different levels can have different access implications. For example, if one administration domain owns a switch, it also means that the administration domain also includes all of the ports of that switch. In contrast, if an administration domain owns all of the ports in a switch, it does not necessarily own the switch itself, unless it is explicitly defined do so. As such, a user in the administration domain that does not own the switch cannot access the general switch configuration although the user can access the port-specific configurations.

SAN resources may also be added to and removed from administration domains through the topology map 304. A context-sensitive menu can be invoked on any of the SAN resources. Among the options provided by the context-sensitive menu in one implementation are "Remove from domain" and "Add to domain", the latter of which provides a list of available domains for selection by the user.

For illustration purposes, it should be noted that one of the Qlogic HBAs and ports 63 and 95 of the 5.158-6140 switch are grayed out and are therefore not owned by the Email Domain. These same resources are also displayed but grayed out in the topology map 304. Because these resources are omitted from the Email Domain, a user who is only a member of the Email Domain will not be able to access the configurations of the grayed out resources. Furthermore, the event log 306 will not display events relating to these omitted resources.

Figure 4:
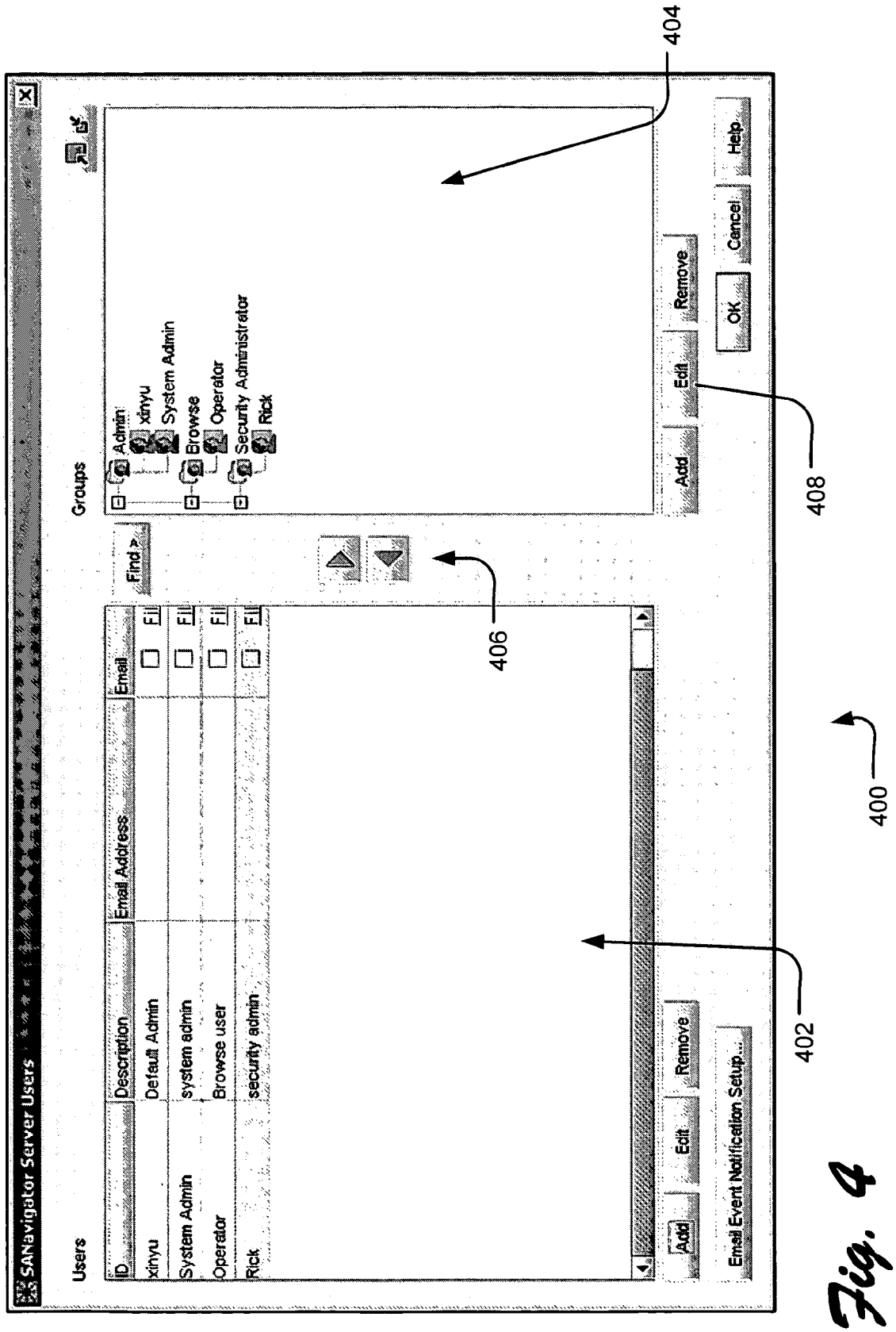
FIG. 4 illustrates a user management dialog box of an exemplary SAN management tool.

FIG. 4 illustrates a user management dialog box 400 of an exemplary SAN management tool. In one implementation, a user is associated with an administration domain using a group. That is, the user is added to a group, and the group is associated with an administration domain. It should be understood that, in alternative implementations, a user may be associated with an administration domain directly or through other indirect means.

The user management dialog box 400 provides a user interface mechanism for adding users to groups. New users can be added to, edited in, or removed from the SAN management software tool using the buttons below the Users box 402. A Groups box 404 identifies the various groups supported by the SAN management software tool and those users who have been added to each group. For example, the Admin group includes two users, Xinyu and System Admin and the Security Administrator group includes one user, Rick. New groups can be added to, edited in, or removed from the SAN management software tool using the buttons below the Groups box 404. The arrow controls 406 can be used to add/remove selected users to/from the groups. The edit button 408 activates a group edit dialog box, such as the one described in regard to FIG. 5.

Figure 5:
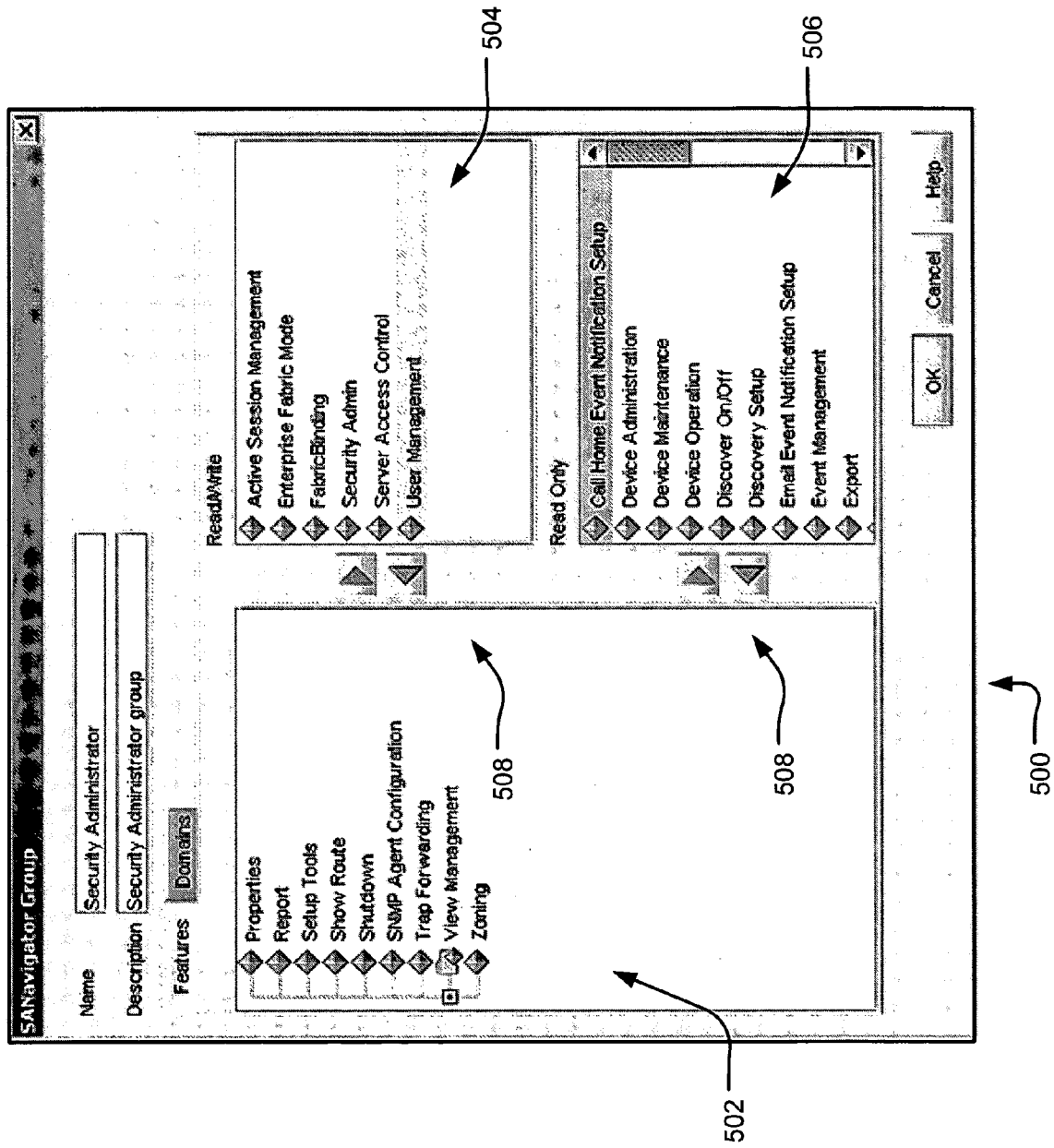
FIG. 5 illustrates a group edit dialog box of an exemplary SAN management tool with the Features tab selected.

FIG. 5 illustrates a group edit dialog box 500 of an exemplary SAN management tool with the Features tab selected. The Name field at the top of the dialog box 500 identifies the group that is configurable in the illustrated instance of the group edit dialog box 500: "Security Administrator". The Features panel 502 includes the list of available features the SAN management software tool can provide to a user. As the group is configured, features are moved between the Features panel 502 to either the Read/Write panel 504 or the Read Only panel 506, thereby setting the level of access users in a given group are granted for individual management features. The arrow controls 508 can be used to add/remove selected features to/from the Read/Write panel 504 or the Read Only panel 506.

In order for a feature to function properly for a given user, certain conditions are to be met, including: (1) the user has proper privileges or permissions to access that feature; (2) the hardware and software are setup and configured properly; and (3) the user is associated with a proper administration domain that includes the resources required by that feature. Some features will operate properly for those resources in the administration domain and not operate on those resources that are not in the administration domain.

Figure 6:
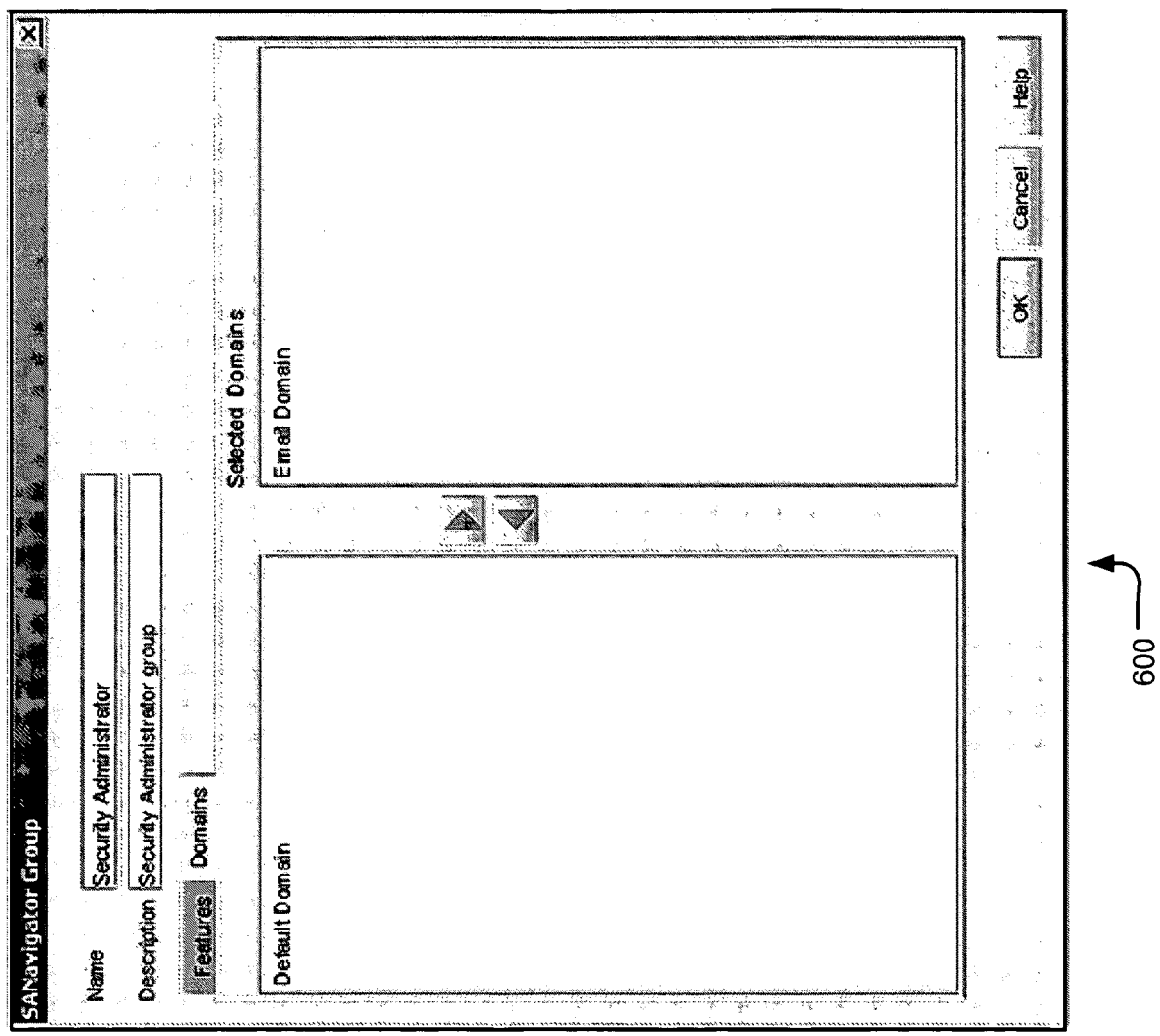
FIG. 6 illustrates a group edit dialog box of an exemplary SAN management tool with the Domains tab selected.

FIG. 6 illustrates a group edit dialog box 600 of an exemplary SAN management tool with the Domains tab selected. The Name field at the top of the dialog box 500 identifies the group that is configurable in the illustrated instance of the group edit dialog box 500: "Security Administrator". The Domains panel 602 includes a list of administration domains available to be associated with a group. Administration domains can be moved between the Domains panel 602 and the Selected Domains panel 604, which lists the administration domains that are associated with the identified group. For example, the Email Domain group has been associated with the group Security Administrator in the illustrated group edit dialog box 600. Accordingly, the association resulting from the Email Domain being listed in the Selected Domains panel 604 grants users who are members of the Security Administrator group to have access to the resources that have been included in the Email Domain (see FIG. 3). The arrow controls 606 can be used to add/remove selected users to/from the groups.

In one implementation, the resources in an administration domain and the features associated therewith are propagated out to all users in the administration domain. For example, if an administration domain NewDomain is created and populated with resources, the profiles of users associated with the NewDomain are altered to reflect which discovered resources the user has access to and the level of access the user has been granted. In one specific implementation, a user profile is embodied in a data structure that references a list of resources the user can access (an "include" list) and a list of resources the user cannot access (an "exclude" list). Likewise, altering an administration domain (e.g., by creating it, removing it, modifying its resources, modifying its group associations, etc.) results in changes to the profiles of users associated with the administration domain. For example, adding a resource to NewDomain results in the resource being added to the user's "include" list. When the user attempts to access a resource, the SAN management software tool merely determines whether the selected resource is in the user's include list. In such an implementation, the association between an administration domain and a user is represented by the resources referenced by the user's profile.

In alternative implementations, a user profile may reference administration domains, or merely the groups, in which the user is included. When the user attempts to access a resource, the SAN management software tool evaluates the relationships among resources, groups, features, and the user, or some combination thereof, to determine whether the user has access to the resource (e.g., is associated with an administration domain containing the resource).

Figure 7:
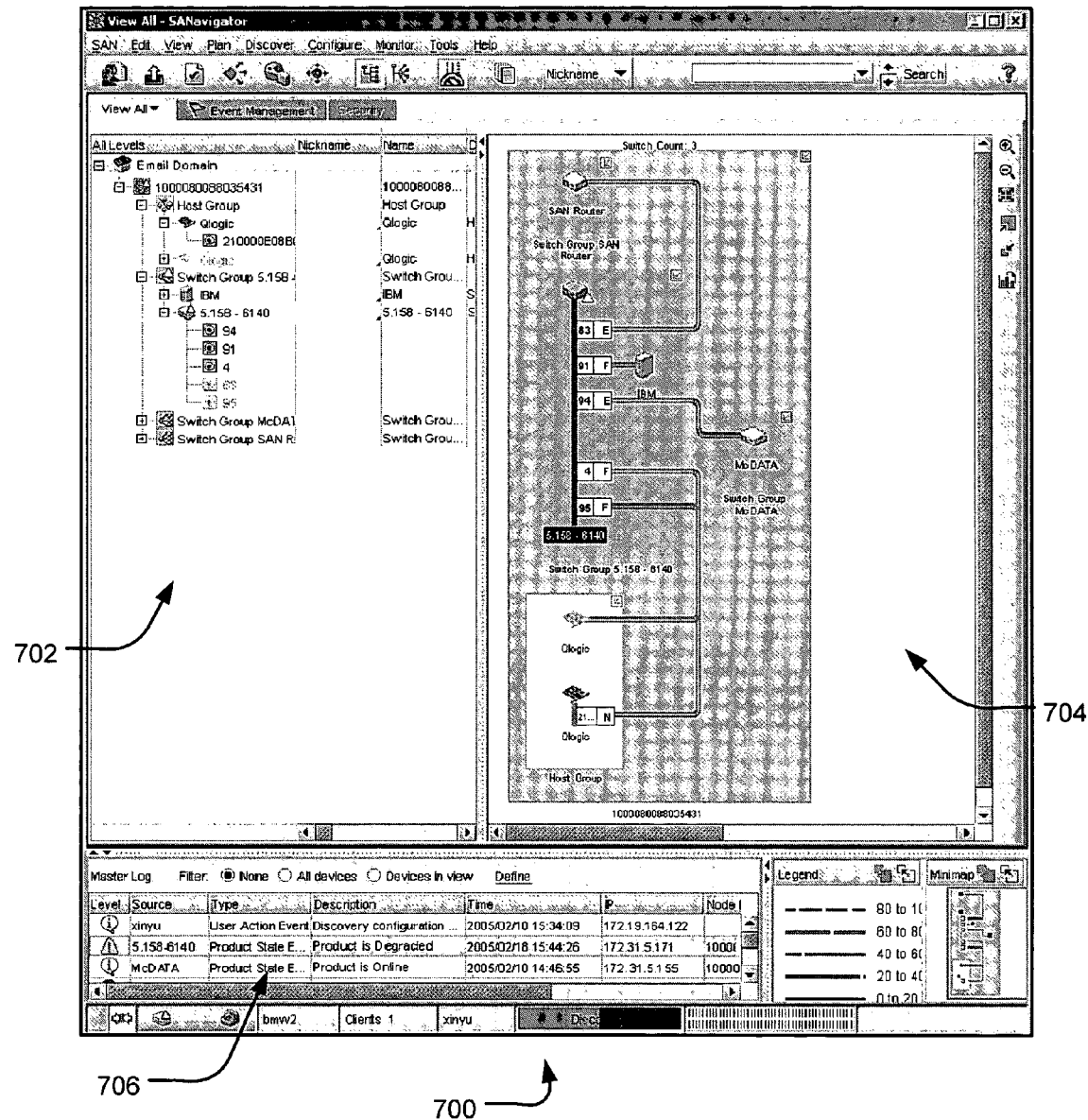
FIG. 7 illustrates a screenshot of an exemplary SAN management tool from the perspective of a user in an administration domain.

FIG. 7 illustrates a screenshot 700 of an exemplary SAN management tool from the perspective of a user in an administration domain. In the context of the screenshot 700, the user logged into the SAN management tool is associated with the Email Domain. This is consistent with the user being a member of the Security Administrator group, which is associated with the Email Domain. Accordingly, the SAN resources included in the Email Domain (see FIG. 3) are displayed in the resource tree 702 and the topology map 704. SAN resource not included in the Email Domain are not displayed, unless the SAN resource in a component of a fabric that is included in the Email Domain, in which case the non-member SAN resource is grayed out.

Furthermore, the SAN management tool, while displaying non-member SAN resources as grayed out, does not allow the user to access the configuration of these SAN resources because the user is not a member of an administration domain that includes these SAN resources. In one implementation, non-configuration access to non-member, grayed-out SAN resource may be allowed by the SAN management tool (e.g., to change a view), but access to configuration commands is disabled or the configuration commands are hidden.

In addition, the event log 706 only displays events relating to SAN resources in the user's administration domain(s). As events 706 are received by the event log handler, the handler only displays events in the event log 706 if they are related to resources in the user's administration domain(s). In this manner, the user is not alerted to events outside of his or her administration domain(s). For example, a resource-specific event is associated with a resource identifier, such as an IP address or a World Wide Name. The event handler walks through a list of accessible resources associated with the user by virtue of the user's membership in one or more administration domains. If the resource is in the list, the event is posted to the user's event log. Otherwise, the event is not displayed. Alternatively, some events are generic in nature and not tied exclusively to specific resources. As such, these events may be passed without regard to the user's membership in a particular administration domain.

Figure 8:
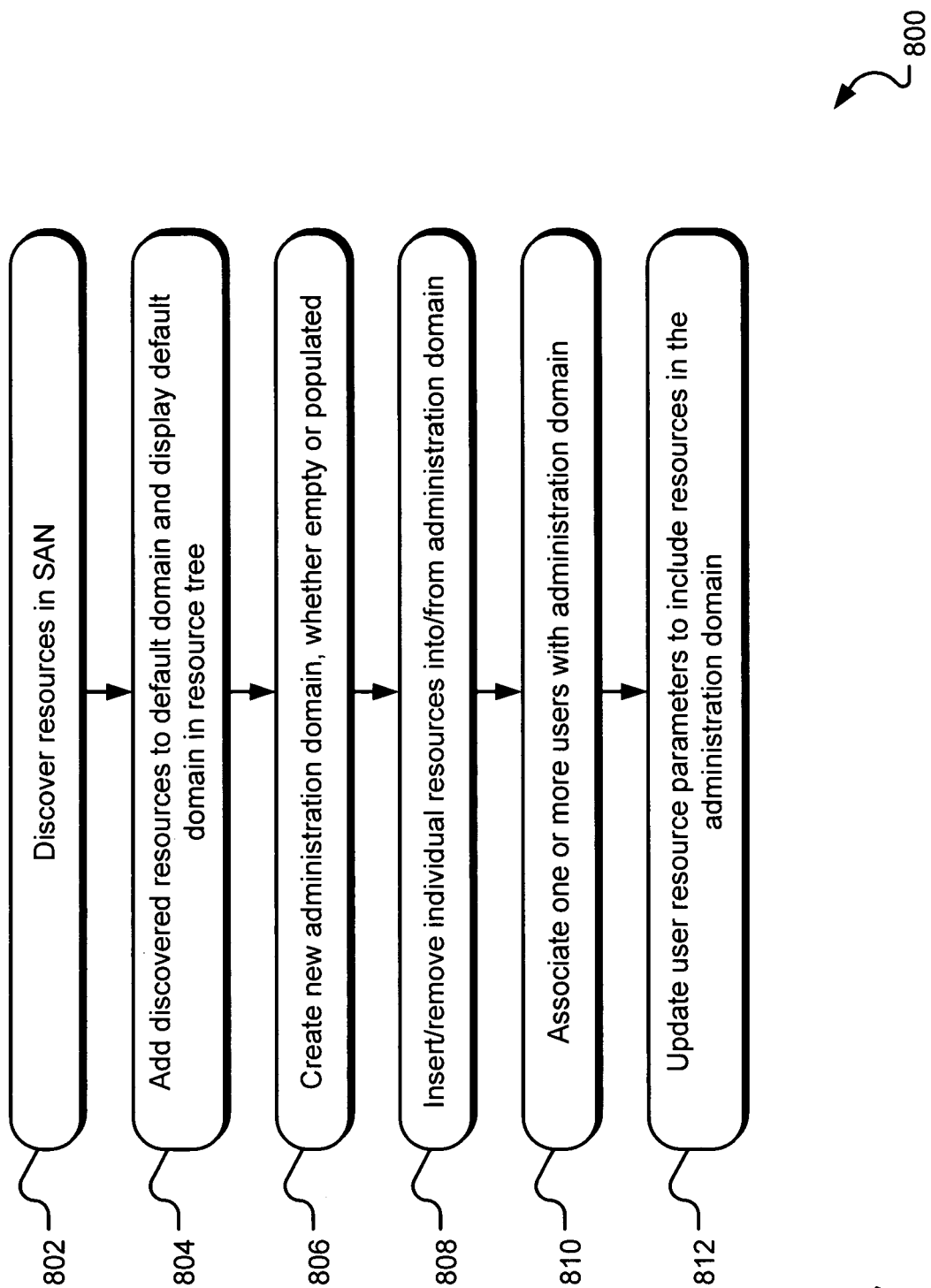
FIG. 8 illustrates exemplary operations for creating an administration domain.

FIG. 8 illustrates exemplary operations 800 for creating an administration domain. A discovery operation 802 probes the SAN and identifies various resources in the SAN. As a result, the SAN management software tool can generated a display of a resource tree and a topology map of those resources. In a compilation operation 804, the set of discovered resources in the SAN is displayed in the default domain resource tree and is internally associated with the default domain (e.g., stored to a table, array, linked list for the default domain object) as "discovered resources".

A creation operation 806 creates a new administration domain, whether empty or populated with resources (e.g., a copy from an existing domain). A modification operation 808 adds one or more individual SAN resources into the administration domain and/or removes one or more individual SAN resources from the administration domain. As discussed, an individual port may be added to the administration domain without added the switch containing the port, for example. However, in one implementation, the switch is displayed (but possibly grayed out) within the hierarchy of the resource tree and/or topology map to provide appropriate context. Nevertheless, the switch is not accessible by the user. In other implementations, the switch is not even displayed.

In an association operation 810, one or more users are associated with the administration domain. In one implementation, the users are grouped into roles or groups, which may be associated with both features or privileges and administration domains. In this manner, the users are granted access to the resources contained in administration domain with which they are associated. This may be determined in real time as each configuration command is initiated by the user, such that the SAN management software tool follows the relationships among users, groups, features, administration domains, and resources to determine whether an association between the user and an administration domain containing the resource exists.

Alternatively, to provide better performance, a user profile is associated with the user and the user profile references a set of resources that the user may access and a set of resources the user may not access. These resources sets are updated in an operation 812 each time there is a change to the administration domain (e.g., a change in group membership, a change in resources, etc.). The SAN management software tool determines the users associated with each changed administration domain and updates the resources list to reflect the newest changes.

Figure 9:
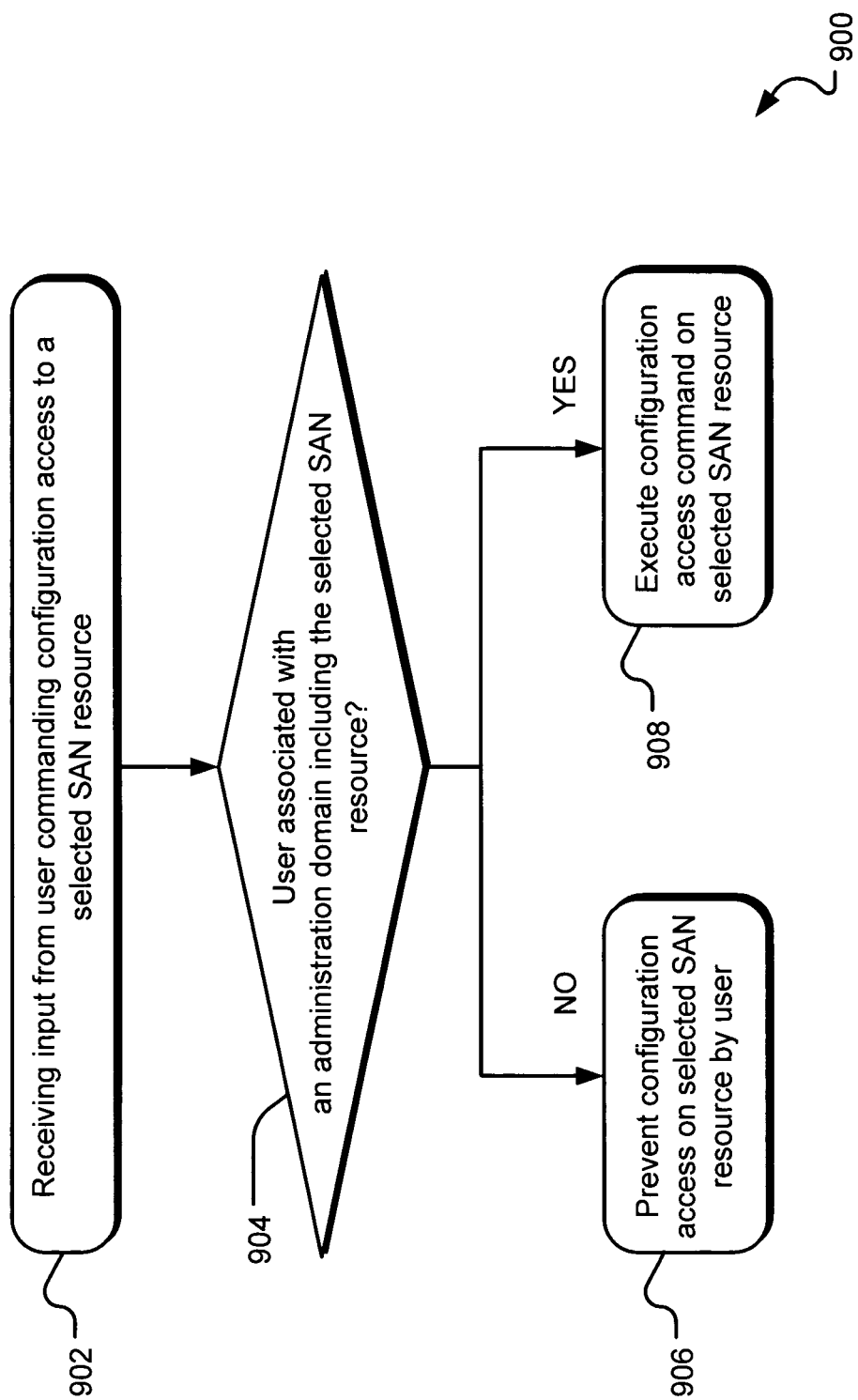
FIG. 9 illustrates exemplary operations for managing access of a user based on administration domains.

FIG. 9 illustrates exemplary operations 900 for managing access of a user based on administration domains. A receiving operation 902 receives a command from a user to access a selected resource (e.g., to read or change configuration properties). A determination operation 904 determines whether the user is associated with an administration domain that contains the selected resources. In one implementation, the SAN management software tool reviews the resources sets references by the user's user profile to determine whether the user is allowed to access the selected resource. Alternatively, the SAN management software tool determines whether the user is allowed to access the selected resource by dynamically identifying the resources contained in administration domains associated with the user, whether directly or indirectly (e.g., through group membership).

If the user is associated with an administration domain that contains the selected resources, then a configuration operation 908 executes the access command to configure or otherwise access the selected resource. Otherwise, a security operation 906 prevents execution of the access command (e.g., terminates the command with an error). In some implementations, the user is alerted that he or she does not have rights to access the selected resource. Also, users associated with administration domains containing the selected resource may be alerted (e.g., through an event) that an unauthorized configuration access was attempted.

Figure 10:
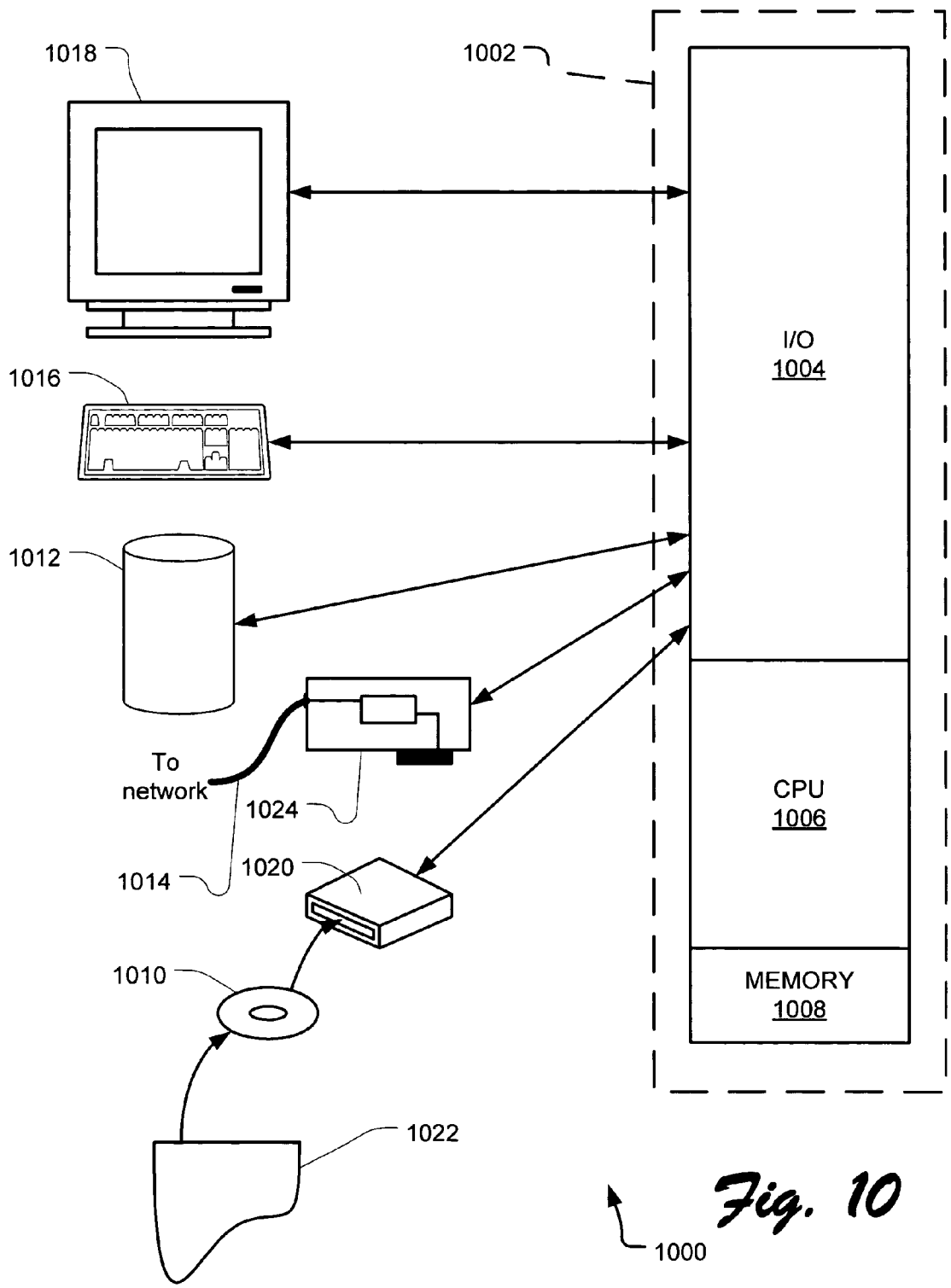
FIG. 10 illustrates an exemplary system useful in implementations of the described technology.

FIG. 10 illustrates an exemplary system useful in implementations of the described technology. A general purpose computer system 1000 is capable of executing a computer program product to execute a computer process. Data and program files may be input to the computer system 1000, which reads the files and executes the programs therein. Some of the elements of a general purpose computer system 1000 are shown in FIG. 10 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 10 to a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1004, on a disk storage unit 1012, or on the DVD/CD-ROM medium 1010 of such a system 1000. Alternatively, a disk drive unit 1020 may be replaced or supplemented by a floppy drive unit, a tape drive unit, or other storage medium drive unit. The network adapter 1024 is capable of connecting the computer system to a network via the network link 1014, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are exemplary and other means of and communications devices for establishing a communications link between the computers may be used.

In accordance with an implementation, software instructions and data directed toward creating and maintaining administration domains, enforcing configuration access control, effecting configuration access of SAN resources by a user, and other operations may reside on disk storage unit 1009, disk drive unit 1007 or other storage medium units coupled to the system. Said software instructions may also be executed by CPU 1006.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

It should be understood that logical operations described and claimed herein may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of managing configuration access by a user to resources of a storage area network, the method comprising:
defining multiple administration domains, each administration domain specifying a subset of the resources designated to provide one application with storage access;
associating the user with one or more of the administration domains;
associating the user with a user profile, wherein the user profile includes a list of resources the user has access to and a level of access for each resource in the list and wherein altering an administration domain associated with the user to change the specified subset of resources results in automatic changes to the list of resources in the user profile; and
allowing the user to access a selected resource, if the selected resource is specified in an administration domain associated with the user; wherein the user's level of access to the selected resource is determined by the level of access listed for the selected resource in the user's profile.

2. The method of claim 1, further comprising:
discovering the resources of the storage area network to generate a discovery results.

3. The method of claim 1, wherein the subset of the resources includes an individually identified switch in the storage area network.

4. The method of claim 1, wherein the subset of the resources includes an individually identified port of a switch in the storage area network.

5. The method of claim 1, wherein the subset of the resources includes an individually identified logical unit number of a device in the storage area network.

6. The method of claim 1, wherein the operation of associating the user with one or more of the administration domains comprises:

referencing one or more of the administration domains using the user profile.

7. The method of claim 1, wherein the operation of associating the user with one or more of the administration domains comprises:
   associating the user with a role, wherein multiple users may be grouped within the role; and
   associating the role with an administration domain.

8. The method of claim 1, wherein the operation of allowing the user to access a selected resource comprises:
   executing a configuration command initiated by the user and targeting the resource.

9. The method of claim 1, further comprising preventing the user from accessing the selected resource, if the resource is not specified in an administration domain associated with the user.

10. The method of claim 1, wherein the subset of the resources are designated to provide the application with storage access.

11. The method of claim 10, wherein the application is an e-mail application.

12. A computer program product encoding a computer program, on a non-transitory storage medium, for a computer process that executes on a computer system that manages configuration access by a user to resources of a storage area network, the computer process comprising:
   defining a plurality of groups of devices, each group of devices servicing one application;
   defining multiple administration domains, each administration domain specifying a subset of the resources corresponding to one of the plurality of groups of devices and corresponding to one application;
   associating the user with one or more of the administration domains;
   associating the user with a user profile, wherein the user profile includes a list of the resources the user has access to and a level of access for each resource in the list and wherein altering an administration domain associated with the user to change the specified subset of resources results in automatic changes to the list of resources in the user profile; and
   allowing the user to access a selected resource, if the selected resource is specified in an administration domain associated with the user; wherein the user's level of access to the selected resource is determined by the level of access listed for the selected resource in the user's profile.

13. The computer program product of claim 12, wherein the computer process further comprises:
   discovering the resources of the storage area network to generate a discovery results.

14. The computer program product of claim 12, wherein the subset of the resources includes an individually identified switch in the storage area network.

15. The computer program product of claim 12, wherein the subset of the resources includes an individually identified port of a switch in the storage area network.

16. The computer program product of claim 12, wherein the subset of the resources includes an individually identified logical unit number of a device in the storage area network.

17. The computer program product of claim 12, wherein the operation of associating the user with one or more of the administration domains comprises:
   referencing one or more of the administration domains using the user profile.

18. The computer program product of claim 12, wherein the operation of associating the user with one or more of the administration domains comprises:
   associating the user with a role, wherein multiple users may be grouped within the role; and
   associating the role with an administration domain.

19. The computer program product of claim 12, wherein the operation of allowing the user to access a selected resource comprises:
   executing a configuration command initiated by the user and targeting the resource.

20. The computer program of claim 12, wherein the computer process further comprises preventing the user from accessing the selected resource, if the resource is not specified in an administration domain associated with the user.

* * * * *